United States Patent
Diederich et al.

(10) Patent No.: US 9,342,460 B2
(45) Date of Patent: May 17, 2016

(54) I/O WRITE REQUEST HANDLING IN A STORAGE SYSTEM

(71) Applicant: International Business Machines Corporation, Armonk, NY (US)

(72) Inventors: Michael Diederich, Mainz (DE); Erik Rueger, Mainz (DE); Rainer Wolafka, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/132,087

(22) Filed: Dec. 18, 2013

(65) Prior Publication Data

US 2014/0195738 A1    Jul. 10, 2014

(30) Foreign Application Priority Data

Jan. 4, 2013 (GB) .................................. 1300089.8

(51) Int. Cl.
| | |
|---|---|
| *G06F 12/08* | (2006.01) |
| *G06F 3/06* | (2006.01) |
| *G06F 13/12* | (2006.01) |
| *G06F 13/38* | (2006.01) |

(52) U.S. Cl.
CPC .......... *G06F 12/0888* (2013.01); *G06F 3/0601* (2013.01); *G06F 3/0607* (2013.01); *G06F 13/122* (2013.01); *G06F 13/124* (2013.01); *G06F 13/385* (2013.01)

(58) Field of Classification Search
CPC ... G06F 13/385; G06F 13/122; G06F 3/0601; G06F 3/0607; G06F 13/124; G06F 12/0888
See application file for complete search history.

(56) References Cited

U.S. PATENT DOCUMENTS

| | | | | |
|---|---|---|---|---|
| 5,764,903 | A | * | 6/1998 | Yu ........................ G06F 11/2071 709/208 |
| 6,021,464 | A | * | 2/2000 | Yao ........................ G06F 3/0619 348/E5.008 |
| 7,328,310 | B2 | | 2/2008 | Bockhaus |
| 7,600,077 | B2 | | 10/2009 | Luc et al. |
| 2002/0013915 | A1 | * | 1/2002 | Migita ................... G06F 3/0613 714/6.13 |
| 2005/0144379 | A1 | | 6/2005 | Eschmann |

(Continued)

OTHER PUBLICATIONS

Search Report under Section 17(5) dated Jul. 10, 2013, Application No. GB1300089.8, 3 pages.
"Cache (computing)", http://en.wikipedia.org/wiki/Cache_%28computing%29, retrieved Dec. 6, 2013, 9 pages.

(Continued)

*Primary Examiner* — Farley Abad
(74) *Attorney, Agent, or Firm* — Francis Lammes; Stephen J. Walder, Jr.; Randall J. Bluestone

(57) ABSTRACT

An I/O write request handling mechanism in a storage system comprising at least one normal storage device and at least one cache device is provided. For each received I/O write request, two parallel threads are created. A first thread attempts to execute the write operation using the at least one normal storage device without using the at least one cache device. A second thread monitors the first thread and is triggered to execute the write operation using the at least on cache device if the first thread has not finished the write operation within a given time threshold. In either case, an I/O write completion response is provided to the external device in order to avoid timing out of the write operation. The at least one cache device is freed from data written by the second thread if the first thread completes the write operation after the given time threshold.

15 Claims, 6 Drawing Sheets

(56) References Cited

U.S. PATENT DOCUMENTS

2011/0138106 A1 6/2011 Prabhakaran et al.
2011/0276768 A1 11/2011 Koren et al.

OTHER PUBLICATIONS

"Cache algorithms", http://en.wikipedia.org/wiki/Caching_algorithm, retrieved Dec. 6, 2013, 7 pages.

* cited by examiner

I/O WRITE REQUEST HANDLING IN A STORAGE SYSTEM

BACKGROUND

The present invention relates in general to the field of write operations in network storage environment, and in particular to a method for I/O write request handling in a storage system, and a corresponding storage system. Still more particularly, the present invention relates to a data processing program and a computer program product for I/O write request handling in a storage system.

The technical area of this invention is about caching strategies and their application in storage system, especially a storage system supporting the CIFS protocol, although not limited only for this application. A cache in the context of this invention is a component that transparently stores data so that requests for that data can be served faster.

Storage systems provide their internal storage capacity via a network to servers, personal computers, and mobile devices. Such a storage system comprises two or more controllers which present a storage capacity of the storage system via external network to one or more external devices, e.g. server, personal computer, mobile device, and smart device. Each storage controller can have multiple access points to external network. The storage controller stores incoming data on internal storage media, e.g. disk drive, tape cartridge, Solid State Disk (SSD), none volatile RAM, via internal network, e.g. Fibre Channel, TCP/IP, Ethernet, InfiniBand. The storage system can comprise multiple internal storage media and multiple internal networks. Storage systems with more than two controllers are also called clustered storage systems.

A connection from an external device via network and an access point to a controller is used to read and write data to the storage system. File-based data protocols like NFS, CIFS, FTP and HTTP are used to handle the data transfer between the external device and the storage systems.

the processing of an I/O request takes too long, the I/O handler on the external device generates a time out error to the application. Applications may not be well prepared for such errors so these errors may result in an application abort, potentially leaving inconsistent data on the Storage system (data corruption).

File-based protocols have a much smaller time-out compared to block-based communication, as block based communication uses more reliable connection such as Fibre Channel. As a result of longer time-outs and more reliable connections, time-out is a problem that is rather rare for block I/O based communication.

To speed up the processing of I/O requests, Storage systems usually are trimmed for performance, thus reducing the likelihood of a long running I/O request. The use of a cache on the storage system is common practice to increase overall performance.

In a write scenario, a cache may not have any free capacity to accept a particular write request. This results in a slow response as the write operation needs to bypass the cache to the stow storage or may need to wait for a cache unit to be freed by a background write to slow storage of the current cache content. Ideally the (write) caching will reduce the amount of slow writes for a given load of the overall system.

The storage media may be slow compared to a cache device, it is also a complex device by itself. It may operate well most of the time, but occasionally may require recalibration or internal recovery causing excessive response time (such as a rebuild of a RAID array which is a quite I/O extensive operation). While the average performance may not be significantly reduced, some single IO requests may take very long. In conjunction with a cache not available (the cache has no free capacity) and IO requested via a file-based protocol such as CIFS, this may lead to an application time out on the CIFS client and as seen on the client applications to corruption.

Standard mitigation is to use a faster storage system, more cache or to reduce the overall load. Faster storage technology and a larger cache typically increase the cost significantly while reducing the client load is not an option either (in fact typically is out of control of the storage system itself).

SUMMARY

In one illustrative embodiment, a method, in a data processing system, is provided for I/O write request handling in a storage system with at least one normal storage device and at least one cache device. The illustrative embodiment receives an I/O write request created by an external device. The illustrative embodiment creates two parallel threads for the write operation associated with the I/O write request. In the illustrative embodiment, the first thread attempts to execute the write operation associated with the I/O write request using the at least one normal storage device without using the at least one cache device. In the illustrative embodiment, the second thread monitors the first thread and is triggered to execute the write operation associated with the I/O write request using the at least on cache device, if the first thread has not finished the write operation within a given time threshold. The illustrative embodiment provides an I/O write completion response to the external device in order to avoid timing out of the write operation. The illustrative embodiment frees the at least one cache device from data written by the second thread, if the first thread completes the write operation after the given time threshold.

In other illustrative embodiments, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In yet another illustrative embodiment, a computer program product comprising a computer useable or readable medium having a computer readable program is provided. The computer readable program, when executed on a computing device, causes the computing device to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

Preferred embodiments of the present invention, as described in detail below, are shown in the drawings, in which.

DETAILED DESCRIPTION

Figure 1:
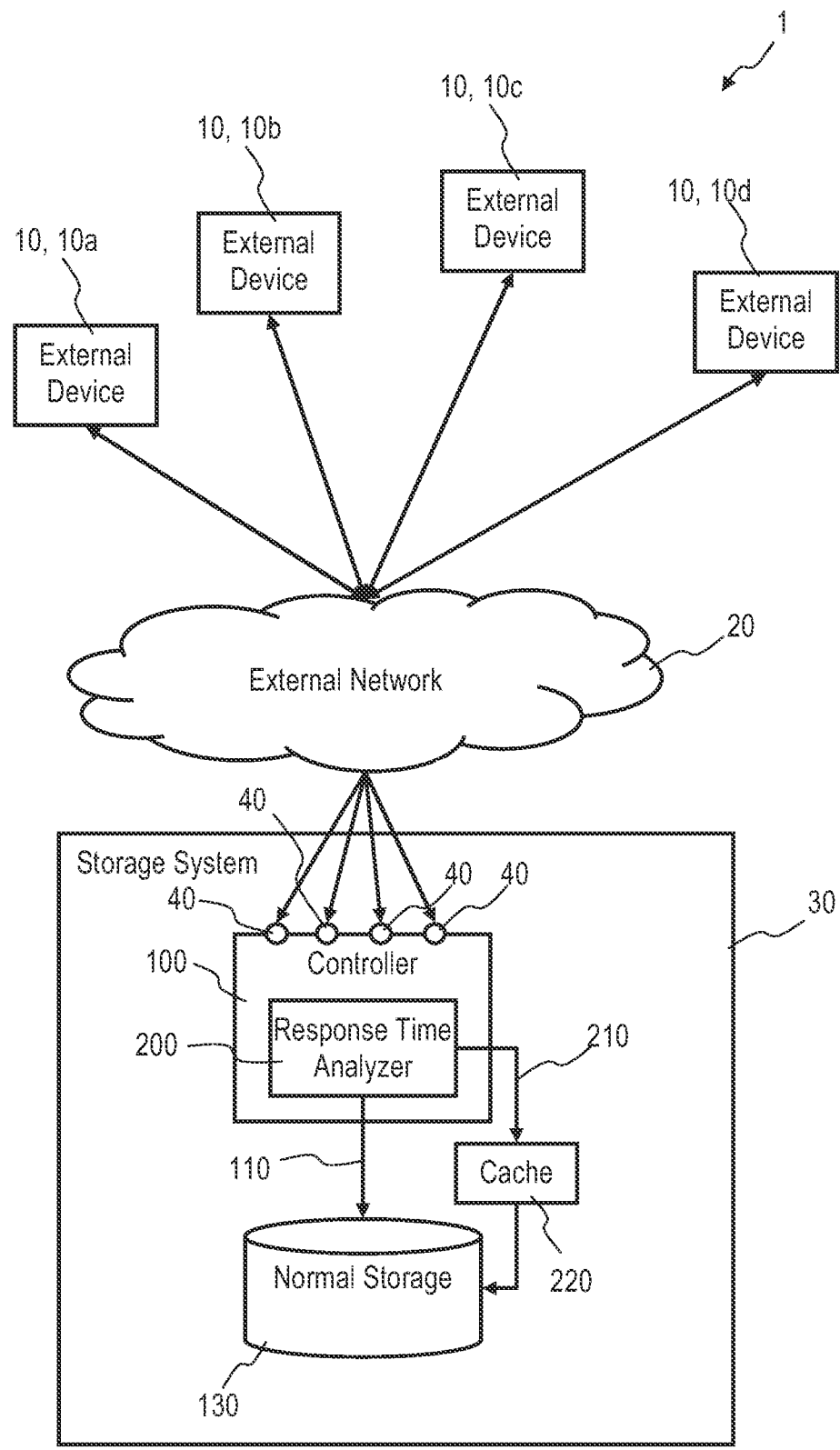
FIG. 1 is a schematic block diagram of a network environment comprising a storage system, in accordance with an embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including hut not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirety on the user's computer, partly on the user's computer, as a stand-alone software package, partly on the user's computer and partly on a remote computer or entirety on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart, illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
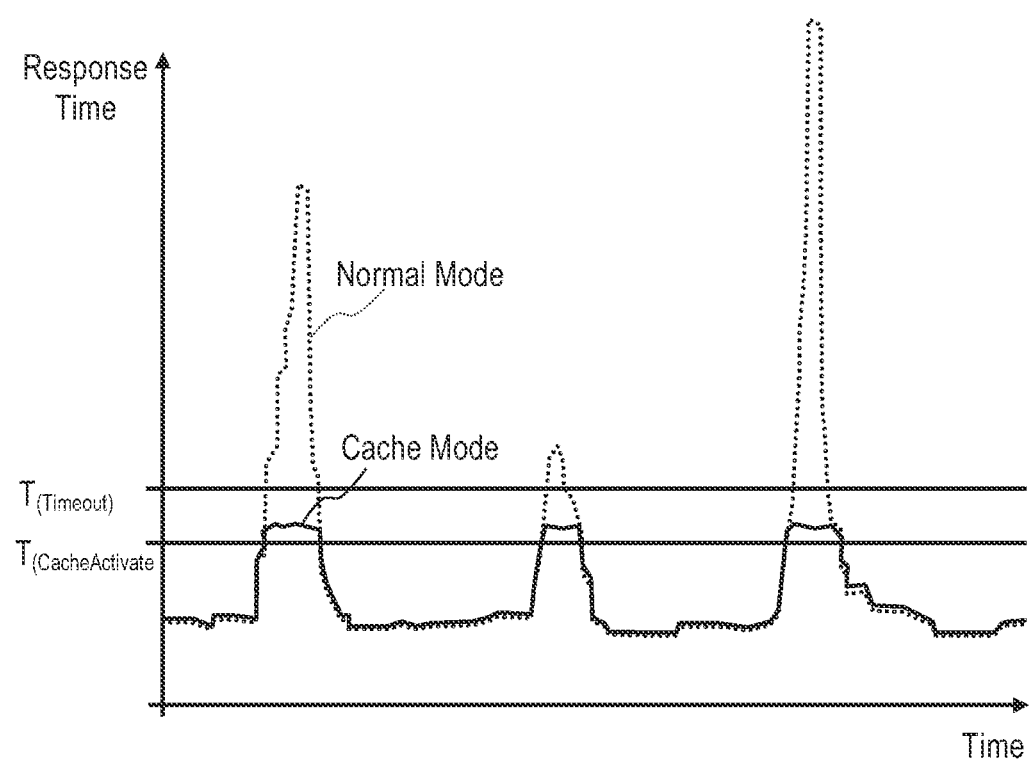
FIG. 2 is a schematic diagram of time lines of response times for a normal mode write process and cache mode write process, in accordance with an embodiment of the present invention.
Figure 3:
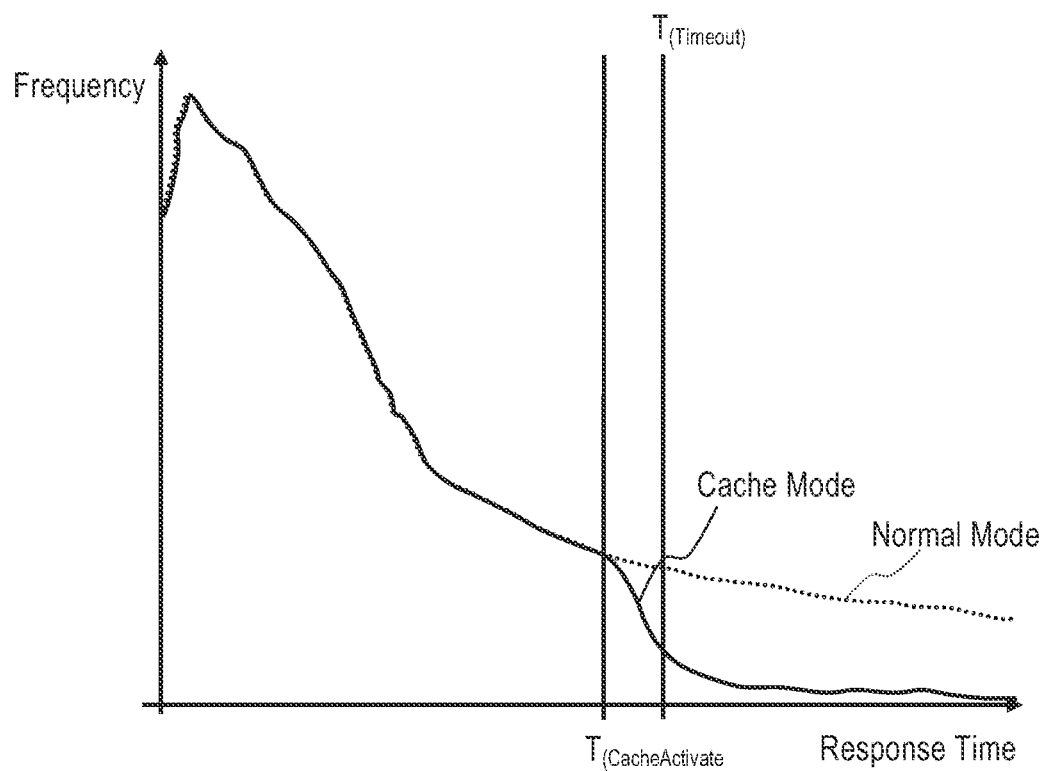
FIG. 3 is a schematic diagram of frequency distributions of response times for the normal mode write process and the cache mode write process, in accordance with an embodiment of the present invention.

FIG. 1 shows a network environment 1 comprising a storage system 30, in accordance with an embodiment of the present invention; FIG. 2 shows time lines of response times for a normal mode write process and cache mode write process, in accordance with an embodiment of the present invention; and FIG. 3 shows frequency distributions of response times for the normal mode write process and the cache mode write process, in accordance with an embodiment of the present invention.

Referring to FIG. 1 the shown network environment 1 comprises at least one external device 10 like servers 10a, personal computers 10b, mobile devices 10c, and smart devices 10d, external network 20, and the storage system 30.

Still referring to FIG. 1, the shown embodiment of the present invention employs the storage system 30 comprising at least one controller 100, at least one normal storage device 130, e.g. disk drive, tape cartridge, Solid State Disk (SSD), none volatile RAM, etc., and at least one cache device 220. Each controller 100 comprises at least one access point 40 to present storage capacity of the storage system 30 via an external network 20 to at least one external device 10, and a response time analyzer 200. The response time analyzer 200 creates two parallel threads T1, T2, shown in FIG. 2, 3, 4, for each write operation in response to a received I/O write request created by an external device 10. A created first thread T1 executes the write operation using a normal I/O path 110 and the at least one normal storage device 130 without using the at least one cache device 220. A created second thread T2 executes the write operation using a cache I/O path 210 and the at least one cache device 220. The response time analyzer 200 first triggers the first thread T1 to execute the write operation and monitors the first thread T1. Further the response time analyzer 200 triggers the second thread T1 to execute the write operation, if the first thread T1 has not finished the write operation within a given time threshold $T_{(CacheActivate)}$. The controller 10 provides I/O write completion response to the external device 10 in order to avoid timing out of the write operation; and the response time analyzer 200 frees the at least one cache device 220 from data written by the second thread 12, if the first thread T1 completes the write operation after the given time threshold $T_{(CacheActivate)}$.

The storage system 30 can comprise multiple internal normal storage media 130, multiple cache devices 220, and multiple internal networks, not shown. Storage systems 30 with more than two controllers 100 are also called clustered storage systems.

A connection from an external device 10 via network 20 and an access point 40 to the controller 100 is used to read and write data to the storage system 30. File-based data protocols like NFS, CIFS, FTP and HTTP are used to handle the data transfer between the external device 10 and the storage systems 30.

The normal storage media 130 is slow compared to the cache device 220; it is also a complex device by itself. It may operate well most of the time, but occasionally may require recalibration or internal recovery causing excessive response time (such as a rebuild of a RAID array which is a quite I/O extensive operation). While the average performance may not be significantly reduced, some single I/O requests may take very long; see "Normal Mode" in FIG. 2. In conjunction with a cache not available, the cache has no free capacity, and I/O requested via a file-based protocol such as CIFS, this may lead to an application time out on the CIFS client 10.

The response time analyzer 200 of the storage system 30 improves the response time in corner cases to reduce the likelihood of CIFS timeout errors and therefore increase the overall acceptable load for a storage system 100.

Referring to FIG. 2, analyzing the I/O processing of the storage system 30 shows that the majority of the I/O response times are well in the expected time frame of an external device 10. FIG. 2 shows the time line of the normal storage system 130 response times as a dashed "Normal Mode" curve. Usually the response time is well below the timeout level $T_{(TimeOut)}$, except for some rare peaks exceeding the timeout level $T_{(TimeOut)}$. For requests below the timeout level $T_{(TimeOut)}$ no quality of service optimization is required. Requests above this timeout level $T_{(TimeOut)}$ will result in time outs for the requesting clients 10 and thus cannot guarantee a quality of service.

The response time analyzer 200 of the inventive storage system 30 detects a potential time out by triggering at the cache activation level $T_{(CacheActivate)}$ below the timeout level $T_{(TimeOut)}$ and will activate the cache device 220. Since the cache device 220 is significantly faster, the total response time can be contained below the timeout level $T_{(TimeOut)}$ which in turn guarantees a quality of service (response time) for the requesting client 10.

For a small subset of I/O requests, the response time is significantly outside the expected time frame. For those specific I/O requests the response time analyzer 200 changes from the "Normal Mode" using the normal I/0 path 110 and the normal storage 130 in a "Cache Mode" using the cache I/O path 210 and the cache device 220. In the "Cache Mode" the response time analyzer 200 dynamically activates the cache device 220 to reduce the response time to an acceptable level avoiding external device 10 to time out. The response time analyzer 200 activates cache device when the internal threshold "cache activation level" $T_{(CacheActivate)}$ is exceeded.

The cache activation level $T_{(CacheActivate)}$ depends on a cache response time $T_{(CacheResp)}$ and a "timeout level" $T_{TimeOut}$ which represents an acceptable response time for external devices 10 accessing the storage system 30.

The cache activation level $T_{(CacheActivate)}$ will be chosen in such a way that the sum of the cache activation level $T_{(CacheActivate)}$ and the expected cache response time $T_{(CacheResp)}$ sum up to less than the timeout level $T_{(TimeOut)}$ of the external device 10. This relationship is described by formula (1):

$$T_{(CacheActivate)} + T_{(CacheResp)} < T_{(TimeOut)} \qquad (1)$$

This can be dynamic depending on the response time analysis of the clustered storage systems 30.

The response time analyzer 200 will monitor each individual request. Once the cache activation level $T_{(CacheActivate)}$ is exceeded, the momentarily slow normal storage system 130 will be by-passed using the cache device 210. So, the response time analyzer 200 intercepts every I/O request and decides whether to use the cache device 220 or not.

Since the cache is kept as empty as possible, the cache response time T(CacheResp) will be fast avoiding the slow process to free the cache device 220 for the request, so that total response time can remain below the critical timeout level $T_{(TimeOut)}$ for the external device 10. Even if the cache device 220 eventually fills up, the probability for hitting the critical timeout level $T_{(TimeOut)}$ is reduced drastically.

FIG. 3 shows the gain achieved by the inventive response time analyzer 200. Considering the nature of the normal storage 130 a certain amount of requests take a very long time, exceeding the timeout level $T_{(TimeOut)}$. The area in FIG. 3 below the dashed response curve and right of the timeout level $T_{(TimeOut)}$ is an indicator of the probability of time-outs. The area is greatly reduced when the response time analyzer 200 does utilize the cache device 220 as described, leading to the solid curve in FIG. 3, and reducing the probability of time-outs. Contrary, a prior art cache device would only compress the curve to the left, leaving the tail of long running requests in place and therefore reduce responses with high response time only marginally.

Figure 4:
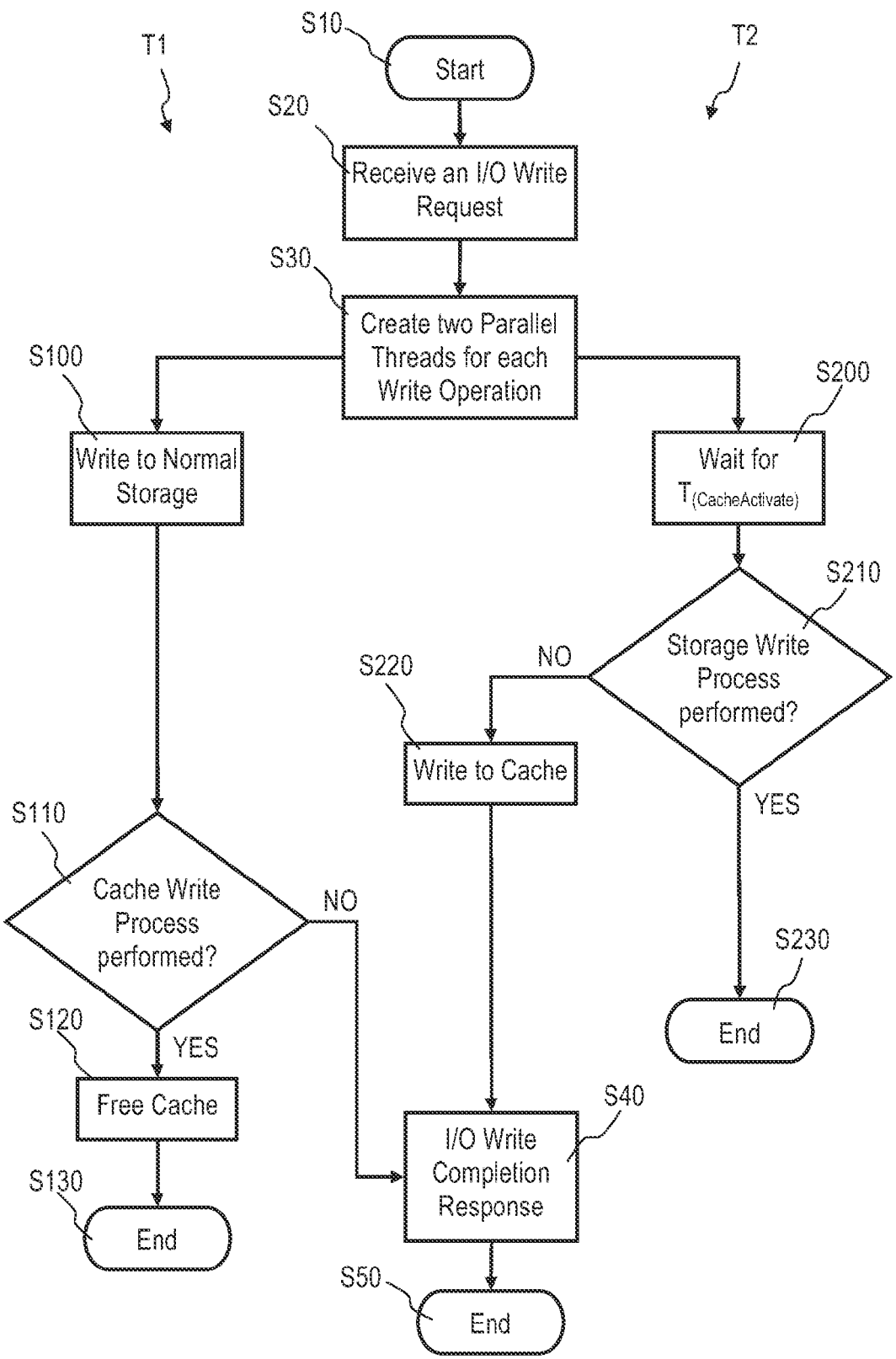
FIG. 4 is a schematic flow diagram of a method for I/O write request handling in a storage system, in accordance with an embodiment of the present invention.
Figure 5:
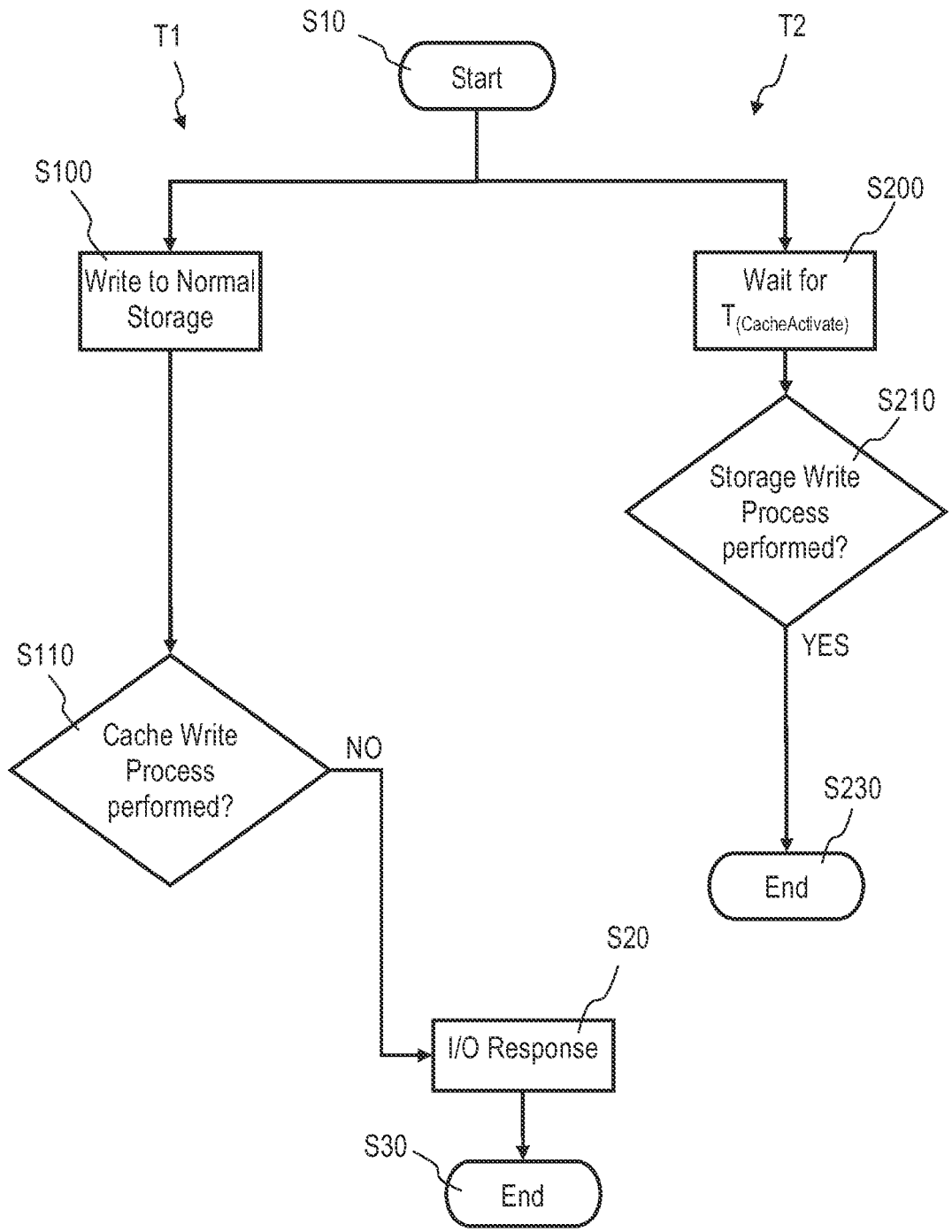
FIG. 5 is a schematic flow diagram of a first exemplary sequence of the method for I/O write request handling in a storage system of FIG. 3, in accordance with an embodiment of the present invention.

FIG. 4 shows a method for I/O write request handling in a storage system 30, in accordance with an embodiment of the present invention; FIG. 5 shows a first exemplary sequence of the method for I/O write request handling in a storage system, in accordance with an embodiment of the present invention; and FIG. 6 shows a second exemplary sequence of the method for I/O write request handling in a storage system, in accordance with an embodiment of the present invention.

Referring to FIG. 4, the shown embodiment of the method starting at step S10 for I/O write request handling in a storage system 30 receives an I/O write request created by an external device 10 in step S20 and creates two parallel threads T1, T2 for each write operation in step S30. The execution threads T1, T2 are interlocked in such a way that only a single I/O response is generated for each request and only one copy of the data. is maintained. So every request is worked on by the two parallel execution threads T1 and T2. Thread T1 steps are S100, S110, S120, thread T2 steps are S200, 210, 220. The fastest execution thread will provide the response to the I/O requester and perform step S40.

Therefore in step S100, a first thread T1 attempts to execute the write operation using the at least one normal storage device 130 without using the at least one cache device 220. After finishing the write process to the normal storage 130, the first thread T1 determines in step S110, if a cache write process was performed by a second thread T2. If the cache write process was performed, the first thread T1 frees the cache device 220 from data written by the second thread T2 and finishes the process in step S130. If no cache write process was performed, the first thread T1 transmits the I/O response to the requesting external device 10, in step S40, and finishes the process in step S50. The parallel executed second thread T2 monitors the first thread T1 and waits until the response time reaches the cache activation level $T_{(CacheActivate)}$, in step S200. After reaching the cache activation level $T_{(CacheActivate)}$, the second thread 12 determines in step S210, if the first thread T1 has finished the normal storage write process. If the normal storage write process was performed, the second thread T2 finishes the process in step S230. If the normal storage write process is not finished, the second thread T2 performs the cache write process in step S220, transmits the I/O response to the requesting external device 10, in step S40, and finishes the process in step S50.

Figure 6:
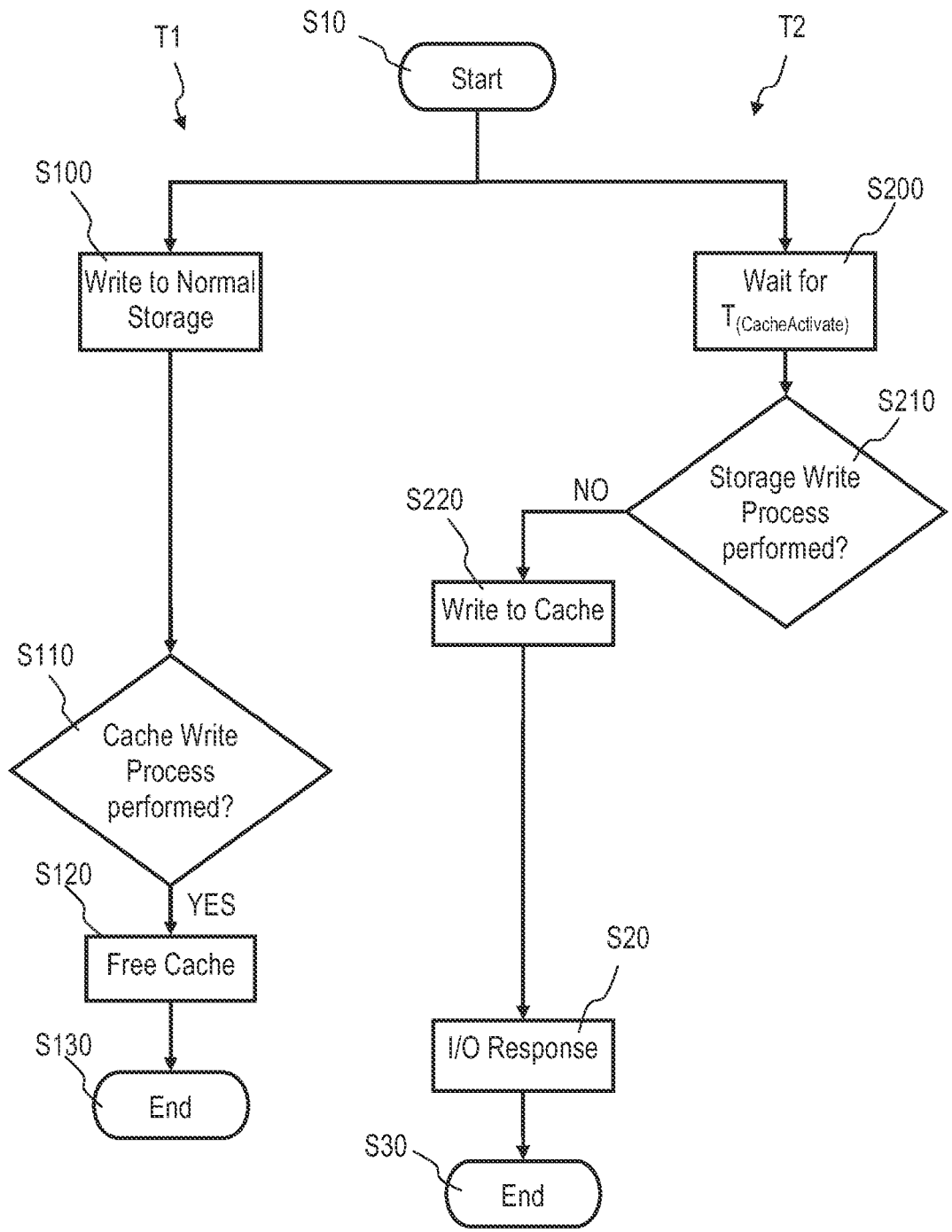
FIG. 6 is a schematic flow diagram of a second exemplary sequence of the method for I/O write request handling in a storage system of FIG. 3, in accordance with an embodiment of the present invention.

Referring to FIGS. 5 and 6, in the first and second exemplary sequences of the method for I/O write request handling in a storage system performed by the response time analyzer 200, in accordance with an embodiment of the present invention, in step S100 thread T1 attempts to write to the normal storage 130, which sometimes may be slow, due to the reasons explained before. The thread T2 attempts to write to the cache device 220, after waiting for cache activation level $T_{(CacheActivate)}$.

FIG. 5 shows the case, where the normal storage 130 is fast, so the first thread T1 will win, and the second thread T2 will terminate without any action. Therefore the first thread writes data to the normal storage and performs step S40 to transmit the I/O response to the requesting external device 10.

FIG. 6 shows the case, where the normal storage 130 is slow, so the second thread T2 will win. So the second thread 12 occupies the cache device 220 until the normal storage 130 has completed the write operation and performs step S40 to transmit the I/O response to the requesting external device 10. After the normal storage 130 has completed the write operation, the cache device 220 is freed in step S120.

The cache utilization is minimized by only using the cache device 220 under the following condition determined by formula (2).

$$T_{util} = T_{130} - T_{(CacheActivate)} \qquad (2)$$

Wherein $T_{util}$ represents the utilization time level, $T_{130}$ represents the response time of the normal storage 130, and $T_{(CacheActivate)}$ represents the cache activation level.

While embodiments of the present invention are illustrated by the usage in a storage subsystem the concept can be embodied in other systems and application as well.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for I/O write request handling in a storage system comprising at least one normal storage device and at least one cache device, the method comprising:
    receiving an I/O write request created by an external device;
    creating two parallel threads (T1, T2) for the write operation associated with the I/O write request;
        wherein the first thread (T1) attempts to execute a write operation associated with the I/O write request using the at least one normal storage device without using the at least one cache device, and
        wherein the second thread (T2) monitors the first thread (T1), and is triggered to execute the write operation associated with the I/O write request using the at least on cache device, if the first thread (T1) has not finished the write operation within a given time threshold ($T_{(CacheActivate)}$);
    providing an I/O write completion response to the external device in order to avoid timing out of the write operation; and
    freeing the at least one cache device from data written by the second thread (T2), if the first thread (T1) completes the write operation after the given time threshold ($T_{(CacheActivate)}$); wherein the given time threshold ($T_{(CacheActivate)}$) depends on a response time ($T_{(CacheResponse)}$) of the at least one cache device and a timeout threshold ($T_{(Timeout)}$).

2. The method according to claim 1, wherein the I/O write completion response to the external device is provided by the first thread (T1), if the first thread (T1) completes the write operation within the given time threshold ($T_{(CacheActivate)}$), and wherein the I/O write completion response to the external device is provided by the second thread (T2) if the first thread (T1) fails to complete the write operation within the given time threshold ($T_{(CacheActivate)}$).

3. The method according to claim 1, wherein the timeout threshold ($T_{(Timeout)}$) represents an acceptable response time for external devices accessing the storage system.

4. The method according to claim 1, wherein the given time threshold ($T_{(CacheActivate)}$) is chosen in a way, that a sum of the given time threshold ($T_{(CacheActivate)}$) and the response time ($T_{(CacheResponse)}$) of the at least one cache device is less than the timeout threshold ($T_{(Timeout)}$).

5. The method according to claim 4, wherein the given time threshold ($T_{(CacheActivate)}$) is dynamic depending on a response time analysis of the storage system and the timeout threshold ($T_{(Timeout)}$) of the external device currently accessing the storage system.

6. A system comprising:
  a processor; and
  a memory coupled to the processor, wherein the memory comprise instructions which, when executed by the processor, cause the processor to:
  receive an I/O write request created by an external device;
  create two parallel threads (T1, T2) for the write operation associated with the I/O write request:
    wherein the first thread (T1) attempts to execute a write operation associated with the I/O write request using the at least one normal storage device without using the at least one cache device, and
    wherein the second thread (T2) monitors the first thread (T1), and is triggered to execute the write operation associated with the I/O write request using the at least on cache device, if the first thread (T1) has not finished the write operation within a given time threshold ($T_{(CacheActivate)}$);
  provide an I/O write completion response to the external device in order to avoid timing out of the write operation; and
  free the at least one cache device from data written by the second thread (T2), if the first thread (T1) completes the write operation after the given time threshold ($T_{(CacheActivate)}$), wherein the given time threshold ($T_{(CacheActivate)}$) depends on a response time ($T_{(CacheResponse)}$) of the at least one cache device and a timeout threshold ($T_{(Timeout)}$).

7. The system according to claim 6, wherein the I/O write completion response to the external device is provided by the first thread (T1), if the first thread (T1) completes the write operation within the given time threshold ($T_{(CacheActivate)}$), and wherein the I/O write completion response to the external device is provided by the second thread (T2) if the first thread (T1) fails to complete the write operation within the given time threshold ($T_{(CacheActivate)}$).

8. The system according to claim 6, wherein the timeout threshold ($T_{(Timeout)}$) represents an acceptable response time for external devices accessing the storage system.

9. The system according to claim 6, wherein the given time threshold ($T_{(CacheActivate)}$) is chosen in a way, that a sum of the given time threshold ($T_{(CacheActivate)}$) and the response time ($T_{(CacheResponse)}$) of the at least one cache device is less than the timeout threshold ($T_{(Timeout)}$).

10. The system according to claim 9, wherein the given time threshold ($T_{(CacheActivate)}$) is dynamic depending on a response time analysis of the storage system and the timeout threshold ($T_{(Timeout)}$) of the external device currently accessing the storage system.

11. A computer program product comprising a non-transitory computer-readable storage medium having computer-readable program stored therein, wherein the computer-readable program, when executed on a computing device, causes the computing device to:
  receive an I/O write request created by an external device;
  create two parallel threads (T1, T2) for the write operation associated with the I/O write request;
    wherein the first thread (T1) attempts to execute a write operation associated with the I/O write request using the at least one normal storage device without using the at least one cache device, and
    wherein the second thread (T2) monitors the first thread (T1), and is triggered to execute the write operation associated with the I/O write request using the at least on cache device, if the first thread (T1) has not finished the write operation within a given time threshold ($T_{(CacheActivate)}$);
  provide an I/O write completion response to the external device in order to avoid timing out of the write operation; and
  free the at east one cache device from data written by the second thread (T2), if the first thread (T1) completes the write operation after the given time threshold ($T_{(CacheActivate)}$) wherein the given time threshold ($T_{(CacheActivate)}$) depends on a response time ($T_{(CacheResponse)}$) of the at least one cache device and a timeout threshold ($T_{(Timeout)}$).

12. The computer program product according to claim 11, wherein the I/O write completion response to the external device is provided by the first thread (T1), if the first thread (T1) completes the write operation within the given time threshold ($T_{(CacheActivate)}$), and wherein the I/O write completion response to the external device is provided by the second thread (T2) if the first thread (T1) fails to complete the write operation within the given time threshold ($T_{(CacheActivate)}$).

13. The computer program product according to claim 11, wherein the timeout threshold ($T_{(Timeout)}$) represents an acceptable response time for external devices accessing the storage system.

14. The computer program product according to claim 11, wherein the given time threshold ($T_{(CacheActivate)}$) is chosen in a way, that a sum of the given time threshold ($T_{(CacheActivate)}$) and the response time ($T_{(CacheResponse)}$) of the at least one cache device is less than the timeout threshold ($T_{(Timeout)}$).

15. The computer program product according to claim 14, wherein the given time threshold ($T_{(CacheActivate)}$) is dynamic depending on a response time analysis of the storage system and the timeout threshold $T_{(Timeout)}$) of the external device currently accessing the storage system.

* * * * *